Aug. 28, 1951  R. I. WEEKES  2,566,047
SANITARY CLOSET
Filed Sept. 16, 1946
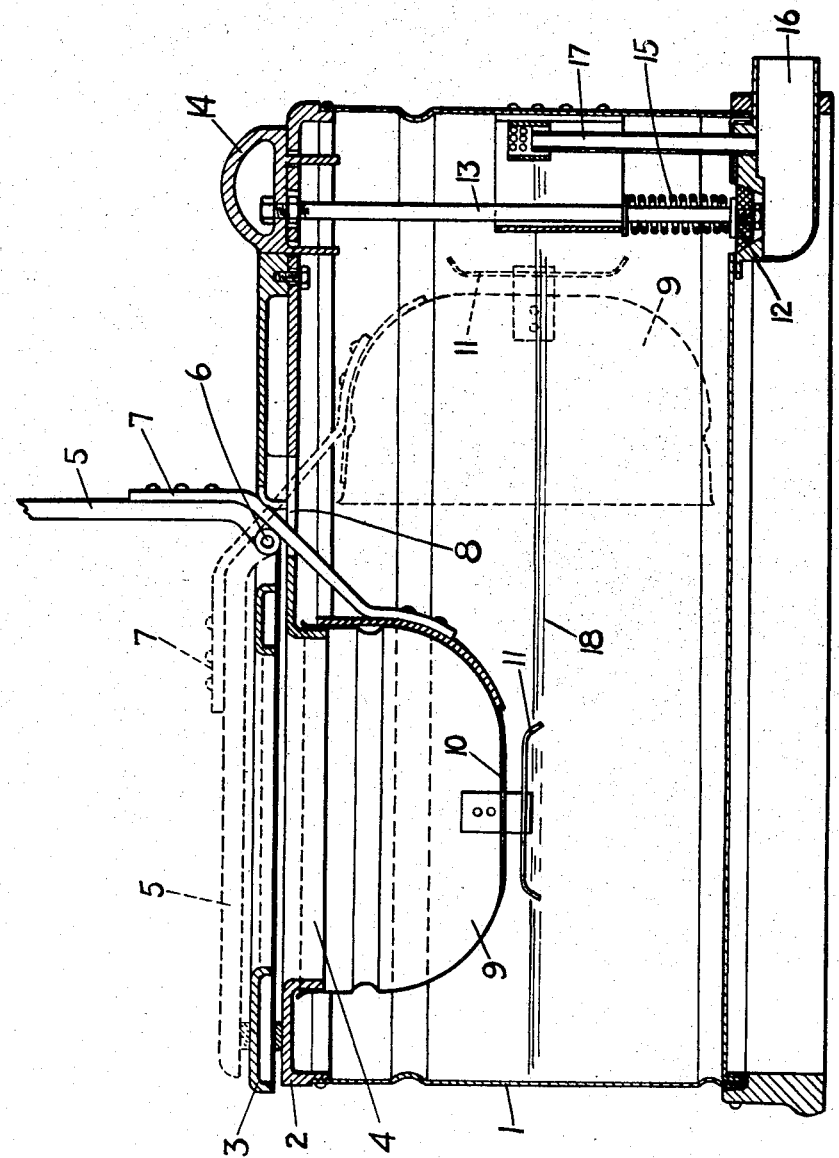
INVENTOR
ROBERT I. WEEKES
BY Young, Emery & Thompson
ATTYS.

Patented Aug. 28, 1951

2,566,047

UNITED STATES PATENT OFFICE 2,566,047

SANITARY CLOSET

Robert Irvine Weekes, Bearsden, Scotland, assignor to The Mofussil Development Corporation Limited, Ayr, Scotland, a British company Application September 16, 1946, Serial No. 697,297
In Great Britain May 8, 1946

5 Claims. (Cl. 4—115)

This invention has reference to an improved self-flushing chemical closet, the object of the invention being to provide a construction having no mechanical parts within the corrosive liquid, thus eliminating mechanical maintenance or repairs.

According to the invention, the closest comprises a cabinet or tank having the usual toilet seat opening therein, and a pan carried by the lower end of an actuating member pivoted about the same axis as a pivoted seat lid affixed to the upper end of the said actuating member, so that, when the lid is open, the pan is positioned beneath the toilet seat opening, and when the lid is closed, the pan is moved rearwards and downwards in a curved path into and through disinfectant liquid contained in the cabinet or tank.

The pan is preferably carried at the end of an actuating lever or pair of levers pivotally mounted on the cabinet or tank which is provided with the usual fixed seat and the toilet opening therein is preferably provided with a depending flange which fits within the rim of the pan when the latter is raised by lifting the seat lid.

The accompanying drawing illustrates a sanitary closet according to one form of the invention and shows the article in section on a vertical central plane.

The drawing shows a cabinet or tank 1 having a fixed cover 2 provided with a toilet seat 3. A toilet opening is formed in the cover 2 by a depending flange 4. The toilet seat 3 is adapted to be closed by a seat lid 5 which is pivoted to the cover 2 on a hinge 6. Fixed to the lid 5 is a lever 7 (or pair of levers) which extends through an opening 8 in the cover 2 and is secured to a pan 9, the rim of which fits around the flange 4. The pan 9, lever 7 and portion of the lid 5 are shown in full lines in the position assumed when the seat lid is opened, and the broken lines indicate the position of the pan 9, lever 7 and lid 5 when the lid is closed. The pan 9 has an opening 10 in the bottom thereof and a deflector 11 fixed to the pan is fitted beneath the opening 10.

The normal level of disenfectant liquid in the cabinet is indicated at 18 from which it will be seen that the pan is raised above the level of the liquid when the seat lid is opened, and that the pan moves into and through the liquid when the lid is closed.

The pan 9 and lever 7 may be made of non-corrodible metal or other non-corrodible material, and the opening 10 enables all liquid to drain from the pan when the lid is lifted.

If desired, the outer end of the lever 7 (or pair of such levers) may be extended and shaped to form a handle for raising and lowering the lid.

The cabinet or tank is fitted at the rear with a drain valve 12 operated by a vertical spindle 13 fitted at its upper end with a handle 14. The valve 12 is seated on its valve seat by a spring 15 on the spindle 13 and controls the outlet to a discharge pipe 16. An overflow pipe 17 is preferably fitted in the cabinet to open into the discharge pipe 16.

Containers for deodorant and toilet paper may be fitted to the outside of the cabinet or tank, the sides of which may also be provided with carrying handles.

The interior of the cabinet and any metal parts which come into contact with liquid in the cabinet are preferably provided with a suitable protective coating against corrosion.

I claim:

1. A sanitary closet comprising a tank for containing disinfectant liquid, a cover for said tank having a toilet seat opening therein, a seat lid pivotally mounted on said cover, a lever rigidly secured to said lid, said lever extending into said tank through an opening in the cover thereof, and a pan rigidly attached to said lever and adapted to be positioned beneath said toilet seat opening when the lid is raised.

2. A sanitary closet comprising a tank for disinfectant liquid, a fixed toilet seat forming a cover for said tank, said seat having a toilet opening therein, a depending flange around and defining said opening, a seat lid pivoted to said cover for closing said opening, a member rigidly secured to said lid, said member extending into said tank, and a pan rigidly connected to said member, said flange fitting within the rim of said pan when the lid is open.

3. A closet as specified in claim 2 in which the pan has an opening in the bottom thereof, and a deflector fixed to the pan and beneath said opening therein.

4. A sanitary closet comprising a cabinet, a cover for said cabinet having a toilet seat opening therein, a pivoted seat lid, an actuating member rigidly attached to and extending from the said lid through an opening in said cover and depending downward rearward of the pivot of the said lid, and a pan rigidly secured to the rearward end of said member so that the lid, the pan and the said member together form a rigidly connected unitary structure and the pan moves in a curved path rearwards and downwards when the lid is being closed.

5. A sanitary closet comprising a tank for containing disinfectant liquid, a cover for said tank having a toilet seat opening therein, a seat lid pivotally mounted on said cover, a lever secured to said lid and extending rearwards therefrom into said tank through an opening in the cover thereof, and a pan secured to said lever so that the lid, the pan and the said lever together form a rigidly connected unitary structure and the pan moves in a curved path rearwards and downwards when the lid is being closed.

ROBERT IRVINE WEEKES.

REFERENCES CITED

The following references are of record in the file of this patent:

UNITED STATES PATENTS

| Number | Name | Date |
| --- | --- | --- |
| 1,264,873 | Scarborough | Apr. 30, 1918 |
| 2,190,040 | Newnes | Feb. 13, 1940 |

FOREIGN PATENTS

| Number | Country | Date |
| --- | --- | --- |
| 80 | Russia | of 1888 |
| 248,305 | Germany | June 9, 1912 |